May 31, 1932.                R. C. MOORE                1,860,684
                               LATHE
                        Filed Sept. 23, 1929        2 Sheets-Sheet 1

May 31, 1932.  R. C. MOORE  1,860,684
LATHE
Filed Sept. 23, 1929   2 Sheets-Sheet 2

Patented May 31, 1932

1,860,684

UNITED STATES PATENT OFFICE

RICHARD C. MOORE, OF PAINESVILLE, OHIO, ASSIGNOR TO THE COE MANUFACTURING COMPANY, OF PAINESVILLE, OHIO, A CORPORATION OF OHIO

LATHE

Application filed September 23, 1929. Serial No. 394,397.

This invention relates to lathes, and more particularly to machines of this character adapted for the production of veneer.

While many features of the invention are of general application to lathes of all kinds, certain of these features are also of particular adaptability to veneer lathes, and especially the arrangements for moving the dogging spindle thereof toward the log, to bring the dogging spindle into driving engagement with the end of the log.

Power means have been provided for this purpose, but under manual control, and with a friction drive or clutch interposed therein to prevent damage due to tardy manual release of the power drive. The coefficient of friction for such clutches or drives varies with the condition of the friction surfaces, so that it is very difficult to obtain the proper thrust thereby. When the friction surfaces are oily, it is practically impossible to exert sufficient force on the spindle to cause the chuck to engage the log sufficiently tight for proper cutting. Under this condition, a brake has been provided to hold the dogging nut stationary, thus effecting the movement of the spindle by the entire power of the main drive of the lathe. The stresses thus produced are enormous, and lathe frames have been broken when this expedient has been employed.

It is, therefore, an object of the present invention to provide a means for moving the dogging spindle into engagement with the log, to exert the proper thrust thereon without entailing the difficulties pointed out above.

It is a further object of the invention to provide a positive drive for exerting the proper thrust on the spindle, thus avoiding the disadvantages of the friction clutch.

Another object is to exert a predetermined maximum thrust on the spindle for moving it into engagement with a log.

Still another object of the invention is to prevent the power drive means for moving the spindle toward the log and exerting a thrust thereon exceeding a predetermined degree.

The foregoing and other objects are accomplished, in the specific embodiment of the invention disclosed herein, by positively driving the dogging spindle toward the log, from an induction motor of the squirrel cage type, having a high torque rotor adapted to develop its maximum torque where the motor stalls.

Other objects and features of novelty will be apparent as the following description proceeds, as taken in conjunction with the accompanying drawings, in which—

Fig. 4 is a fragmentary top plan view of the circuit breaker switch actuated by the clutch lever; and Fig. 5 is a diagram of the wiring of the independent motors.

Figure 1:
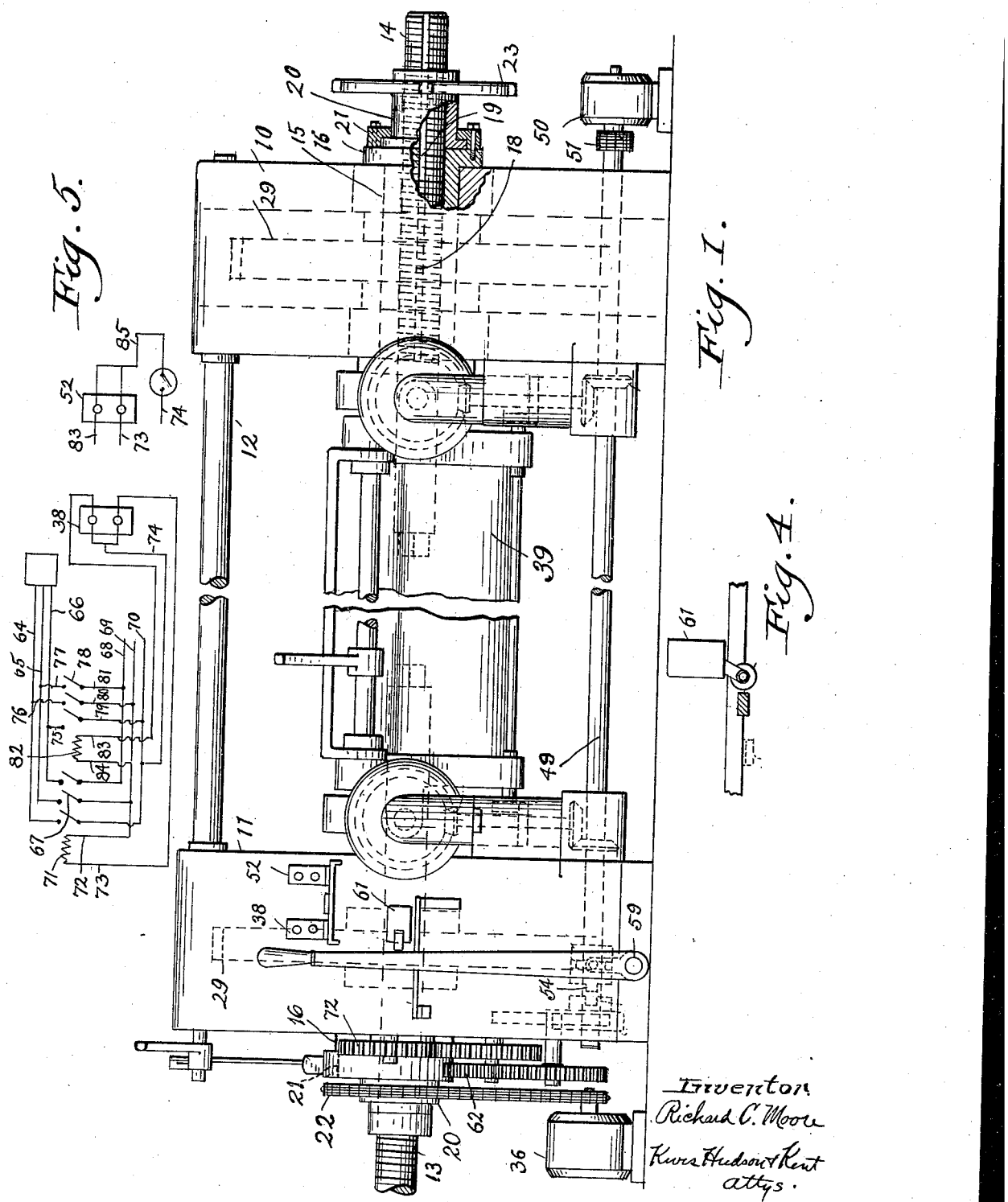
Fig. 1 is a vertical rear view of the lathe or the operator's side of the lathe.
Figure 2:
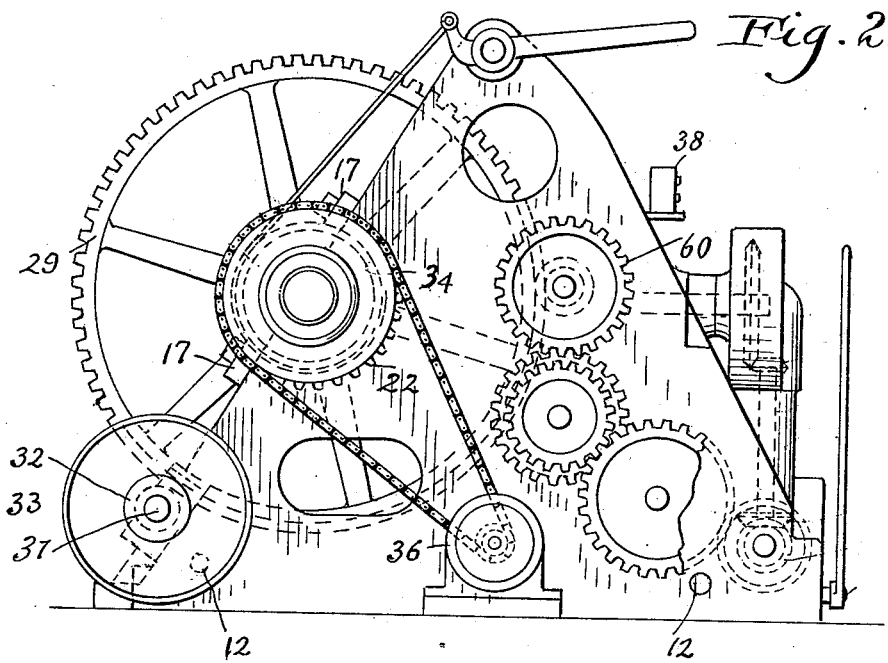
Fig. 2 is an end view of the dogging end of the lathe.

The present invention is illustrated in connection with a type of veneer cutting lathe heretofore disclosed. A pair of standards 10 and 11 are connected together by spacers 12. The standards 10 and 11 suitably support a pair of horizontally movable spindles, the dogging spindle being indicated by 13 and the tail spindle being indicated by 14.

The front or log side of the standards 10 and 11 is provided with a transverse recess 15 which receives and supports a spindle sleeve 16. The spindles 13 and 14 are exteriorly screw-threaded and extend through the sleeve 16, the latter being provided with a depending tongue or spline 18 engageable with a cooperating groove or keyway 19 extending throughout the length of the spindle.

To impart axial movement to the spindle 13 to thrust it into engagement with the end of a log, a spindle driving sleeve 20 interiorly screw-threaded engages the screw-threads of the spindle and is rotatably mounted within a locking member 21 which is suitably bolted to the spindle sleeve 16. The spindle driving sleeve 20 which is associated with the spindle 13 has securely mounted upon its free end a sprocket wheel 22 which is adapted to rotate the spindle driving sleeve 20 to cause longitudinal movement of the spindle 13 in either direction depending upon the direction of rotation of the sprocket wheel. It will, therefore, be seen that to reciprocate the spindle 13 toward or away from the spindle 14, the sprocket wheel 22 is rotated in the proper direction. The spindle driving sleeve 20, which is associated with the spindle 14, is provided with a hand-wheel 23.

A pair of bull gears 29 are positioned within suitable slots in the face of each standard and securely supported upon the spindle sleeves 16. These bull gears 29 are keyed to the spindle sleeves 16 so that upon rotation imparted to the bull gears, the log is rotated in the proper direction. A main power shaft 31 extends horizontally adjacent the lower portion of the standards and is secured thereto in suitable bearings 32 provided upon the face of the standards. This shaft 31 has keyed thereto a pair of pinions 33 which engage with the bull gears 29. It will be readily understood from the foregoing description then that the log is rotated while the veneer is being cut therefrom by causing rotation of the main drive shaft 31 and that the reciprocation of the spindles 13 and 14 is independent thereof.

The sprocket wheel 22 is actuated by a chain 34 having a positive drive from a reversible motor 36 connected in a suitable circuit. The direction of rotation of the armature is controlled by push button switch 38. When one button on the switch 38 is depressed, the motor 36 is actuated to move the dogging spindle in one direction, and when the other button of the same switch is depressed, the spindle is moved in the opposite direction.

A slidably mounted carriage 39 supports the veneer cutting knife for movement toward and away from the log. Threaded shafts which move the carriage are driven by suitable gearing from a carriage feed shaft 49 driven by chain 51 from motor 50. The motor 50 is connected in a circuit in series with a push button switch 52 mounted adjacent the switch 38. Shaft 49 is also connected to the main drive shaft 31 by suitable gearing 60 and clutch mechanism 54. The wiring diagram of Fig. 5 shows the circuits for the dogging spindle motor and the carriage feed motor. The dogging spindle motor 36 has three conductor wires 64, 65 and 66. A triple knife switch 67 normally biased open has its terminals connected to conductor wires 68, 69 and 70, the wires 68 and 70 being connected to one side of the main line while the wire 69 is connected to the other side of the main line. The switch 67 is closed by energizing a solenoid 71 connected by a wire 72 to the conductor wire 69 and by a wire 73 to the "out" push button of the switch 38. A return wire 74 is connected between the "out" push button and the conductor wire 70. To reverse the direction of rotation of the motor 36, the wires 75, 76 and 77 are suitably connected as shown in Fig. 5 to the conductor wires 66, 64 and 65, respectively, and to a plurality of contact fingers. A triple knife switch 78 is normally biased open and connected by wires 79, 80 and 81 to the conductor wires 70, 69 and 68, respectively. The switch 78 is closed by energizing of solenoid 82 connected by a wire 83 to the "in" push button, and connected by a wire 84 to the wire 69 leading to the main line. The "in" push button is connected to the return wire 74.

The wiring for the circuit of the carriage feed motor is the same as the wiring of the dogging spindle motor with one exception. A circuit breaker switch 61 is employed for controlling the circuit of the carriage feed motor so that the knife carriage 39 cannot be moved thereby in either direction so long as it is connected through the gear mechanism with the main drive shaft 31.

The return wire 74 for the dogging spindle motor 36 is connected to the circuit breaker switch 61. A wire 85 is connected to the circuit breaker switch 61 and to a terminal of "in" and "out" buttons of the push button switch 52 and as long as the clutch 54 is in engagement with the circuit breaker switch 61, the motor 50 can be actuated by depressing either the "in" or "out" button depending upon the desired direction of movement of the carriage. However, when the clutch is moved out of engagement with the circuit breaker, the circuit is opened and the motor cannot be actuated by either of the push buttons of the switch 52.

The structure described above is old in the art, and forms no part of the present invention other than in combination with the structure now to be described.

Figure 3:
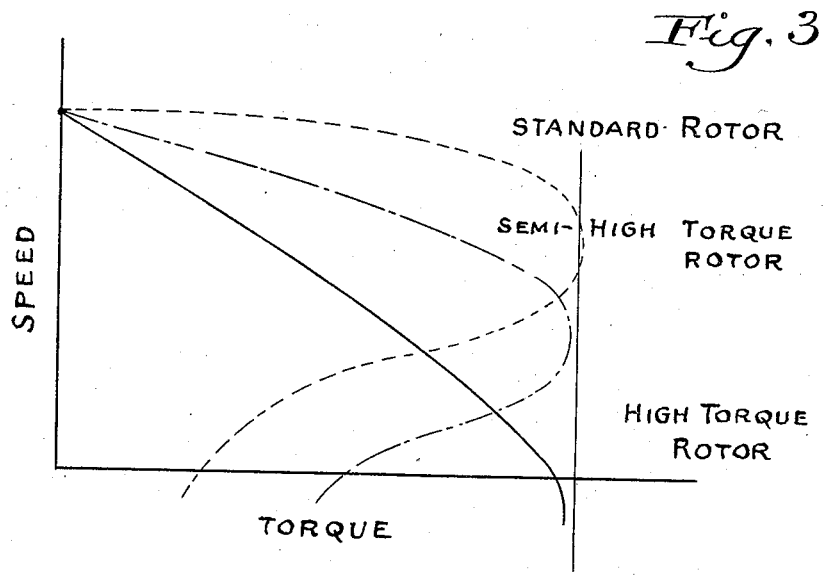
Fig. 3 is a curve plotted with torque abscissas and speed ordinates, showing a comparison of torque-speed characteristics of induction motors with various rotors.

According to the present invention method and means are provided for moving the spindle rapidly into engagement with the log, decreasing the speed of such movement in proportion to the resistance of the log, and ceasing when the log offers a maximum resistance to such movement. For this purpose the motor 36 is an induction motor of the squirrel cage type having a high torque rotor which develops its greatest torque at standstill. The torque speed characteristic of this rotor is illustrated in Fig. 3 by a solid line in comparison to that of a semi-high torque rotor shown by a dot and dash line, and a standard rotor shown by a dotted line. From these curves it will be noted that with the standard motor greatest torque is developed at about 75% speed and that at standstill the torque is less than half the maximum. With the semi-high torque rotor maximum torque is developed at about 30% speed while at standstill the torque is little over half the maximum. With the high torque rotor the highest torque is developed at standstill and decreases as the speed increases.

The characteristic of the motor 36 is therefore such that if the switch 38 is held connected until the motor stalls, its greatest torque has been exerted in moving the spindle 13 to thrust its associated chuck into the end of the log. When the switch 38 is operated reversely, the same maximum torque is developed in order to remove the chuck from the log. As an additional advantage, the amount of current used by the motor 36 is such that the torque per ampere at standstill is about twice as great as for the standard motor, and about 50% greater than for the semi-high torque motor.

The motor 36 is quick acting, and yet sufficiently powerful to dog the log tight enough for cutting, thus avoiding the disadvantages of the friction drive. As the motor has a predetermined maximum torque, each log is dogged with exactly the same pressure or spindle thrust. This does away with excessive loads on the thrust bearings, avoiding frequent renewal thereof, and avoiding excessive strains in the frame.

While one embodiment of the invention has been disclosed in detail, the broad idea of the invention is not limited thereto, but includes such embodiments as fall within the scope of the subjoined claims.

Having thus described my invention, what I claim is:

1. In a veneer lathe, means adapted to be moved into engagement with the end of a log, and means for thrusting said means into engagement with a log, includuing a rotary drive means having an inherent maximum torque characteristic for driving said thrusting means.

2. In a veneer lathe, means adapted to be moved into engagement with a log, and means for so moving said means including a motor having its greatest torque at standstill for driving said moving means.

3. In a veneer lathe, means adapted to be moved into engagement with a log, and means for so moving said means, including an induction motor which develops its greatest torque when the motor stalls for driving said moving means.

4. In a veneer lathe, means adapted to be moved into engagement with a log, and means for so moving said means, including a squirrel cage motor having a high torque rotor for driving said moving means.

5. In a veneer lathe, means adapted to be moved into engagement with a log, and means for so moving said means, including a motor having a substantially rectilinear inverse speed torque characteristic for driving said moving means.

6. In a veneer lathe, a tail spindle adapted to engage the end of a log, a dogging spindle adapted to be moved into engagement with the opposite end of the log for securing the same between the spindles, and a positive driving means having an inherent maximum thrust for moving said dogging spindle and for stopping said dogging spindle moving means automatically when a predetermined pressure is exerted between said spindles.

7. In a veneer lathe, a tail spindle and a dogging spindle respectively adapted to be moved into engagement with the ends of a log to support the log therebetween, and driving means for actuating said dogging spindle toward said tail spindle and adapted to stop automatically after a predetermined actuation.

8. In a veneer lathe, a tail spindle and a dogging spindle respectively adapted to engage the ends of a log, means for respectively supporting said spindles, and automatic driving means for actuating said dogging spindle until a predetermined thrust has been exerted thereby upon the end of the log.

In testimony whereof, I hereunto affix my signature.

RICHARD C. MOORE.